United States Patent
Tan et al.

(10) Patent No.: US 10,733,115 B2
(45) Date of Patent: Aug. 4, 2020

(54) INFORMATION HANDLING SYSTEM AUTOMATED WIRELESS PAIRING OF PERIPHERAL DEVICES

(71) Applicant: Dell Products L.P., Round Rock, TX (US)

(72) Inventors: Geroncio O. Tan, Austin, TX (US); Anand P. Joshi, Round Rock, TX (US); Chris E. Pepper, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 317 days.

(21) Appl. No.: 15/010,309

(22) Filed: Jan. 29, 2016

(65) Prior Publication Data
US 2017/0220490 A1    Aug. 3, 2017

(51) Int. Cl.
*G06F 13/10* (2006.01)
*G06F 1/16* (2006.01)
*H04W 4/80* (2018.01)

(52) U.S. Cl.
CPC .......... *G06F 13/102* (2013.01); *G06F 1/1616* (2013.01); *G06F 1/1632* (2013.01); *G06F 1/1654* (2013.01); *G06F 1/1662* (2013.01); *H04W 4/80* (2018.02)

(58) Field of Classification Search
CPC ..... G06F 13/102; G06F 1/1662; H04W 4/008
See application file for complete search history.

(56) References Cited

U.S. PATENT DOCUMENTS

| | | | |
|---|---|---|---|
| 2005/0085934 A1* | 4/2005 | Jin | H04R 5/02 700/94 |
| 2007/0032195 A1* | 2/2007 | Kurisko | H04L 63/061 455/41.2 |
| 2009/0112339 A1* | 4/2009 | Huang | G06F 1/1632 700/94 |
| 2011/0126005 A1* | 5/2011 | Carpenter | G06F 13/385 713/158 |
| 2013/0031377 A1* | 1/2013 | Sultenfuss | G06F 1/1632 713/300 |
| 2014/0075075 A1* | 3/2014 | Morrill | G06F 1/1632 710/303 |
| 2014/0273845 A1* | 9/2014 | Russell | H04W 8/005 455/41.2 |
| 2014/0307607 A1* | 10/2014 | Clark | H04W 52/0235 370/311 |
| 2014/0378055 A1* | 12/2014 | Pal | H04W 8/005 455/41.2 |
| 2015/0105014 A1* | 4/2015 | Kulavik | H04W 4/008 455/41.1 |
| 2016/0285524 A1* | 9/2016 | Liu | H04B 7/0404 |

* cited by examiner

*Primary Examiner* — Tim T Vo
*Assistant Examiner* — Herve Iradukunda
(74) *Attorney, Agent, or Firm* — Zagorin Cave LLP; Robert W. Holland

(57) ABSTRACT

A tablet information handling system keyboard stand stores pairing information in non-transitory memory accessed by an embedded controller upon detection of a physical connection with a tablet information handling system and communicated to an embedded controller in the tablet information handling system through the physical interface. Embedded controller cooperation coordinates configuration of a wireless personal area network interface without wireless communication or power applied to the wireless networking resources.

18 Claims, 4 Drawing Sheets

INFORMATION HANDLING SYSTEM AUTOMATED WIRELESS PAIRING OF PERIPHERAL DEVICES

BACKGROUND OF THE INVENTION

Field of the Invention

The present invention relates in general to the field of information handling system peripheral devices, and more particularly to an information handling system automated wireless pairing of peripheral devices.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems generally include integrated input/output (I/O) devices and an integrated power sources to allow end users to use the systems without coupling to external I/O devices or power sources. For example, an information handling system clamshell configuration generally has a main housing portion that contains processing components and an integrated keyboard, and a lid housing portion rotationally coupled with the main housing portion that contains a display. In normal use, an end user rotates the lid portion approximately 90 degrees to elevate the display into a viewing position and expose the keyboard in the main housing portion. During periods of non-use or transport, the end user rotates the lid closed relative to the main housing portion to protect both the keyboard and the display. In some instances, the lid housing portion or display rotates in a manner that exposes the display with the lid portion closed relative to the main portion, thus allowing the information handling system to be used as a tablet.

Portable information handling systems have shrunk in size and increased in capabilities as more powerful processing components have been developed. One general goal of information handling system manufacturers has been to decrease the thickness or Z height of information handling system housings. In particular, tablet information handling systems have sought to provide a minimal planar housing thickness that makes the system more convenient for end users to carry and use. Tablet information handling systems typically use a touchscreen display as the primary input device, such as by presenting a keyboard on the display that accepts keyed end user inputs with touches at the display. Eliminating the mechanical keyboard reduces housing size, however, tends to limit the usefulness of the system for performing tasks that generally require keyed inputs, such as word processing. As a result, end users tend to limit the applications run on tablet information handling systems to those that have minimal keyboard inputs, such as web surfing, e-mail and texting.

One solution that aids keyed inputs to a tablet information handling system is to interface with the tablet system through a peripheral keyboard device. As an example, a base or tablet stand holds a tablet display in an elevated viewing position and includes a keyboard that accepts inputs to the tablet system. For example, the tablet has a connector port located along a side of the housing that inserts into a connector of the base to communicate with a keyboard integrated in the stand. In some instances, tablet information handling systems include only a single USB port that is relied on to both charge the system and communicate data. In other instances, tablet housings will include pogo pins along one side that provide a touch interface to pogo pins of the stand and held in position by the weight of the tablet system or an attachment device in the stand. In essence, a base or tablet stand that integrates a physical keyboard converts the tablet into a clamshell configuration that includes an option for the user to separate from the stand and use the tablet separately as desired.

Another way for a user to interface a keyboard with a tablet information handling system is to interface through a wireless signal, such as Bluetooth. One difficulty with using wireless protocols is that the keyboard and tablet information handling system have to pair with each other in order to communicate data. A typical Bluetooth pairing process involves several steps. First the tablet information handling system wireless network interface card has to be put into discovery mode. Next the keyboard has to be put into an advertisement mode that can be seen in discovery. Finally, the end user selects the keyboard from a list of discovered devices to establish data transfer. In some cases, discovery may be automated and issued from the keyboard, such as with a button touch, with the tablet information handling system advertising to be discovered by the peripheral. One difficulty with the discovery and pairing process is that in an enterprise environment multiple systems and peripherals may be performing discovery and pairing within range of each other, thus presenting the end user with a complex selection of multiple devices or even pairing incorrect peripherals and information handling systems. Further, in an enterprise environment, peripheral devices are sometimes mixed and matched as needed so that an end user may have to repeat the pairing process every time the end user interfaces with a peripheral device. In some cases, end user confusion is intensified where automated pairing of an information handling system and previously-paired peripheral device results in the end user having an unintended association with a peripheral device previously used by the information handling system and stored in memory.

SUMMARY OF THE INVENTION

Therefore, a need has arisen for a system and method which provides information handling system automated pairing of wireless peripheral devices.

In accordance with the present invention, a system and method are provided which substantially reduce the disadvantages and problems associated with previous methods and systems for pairing of a wireless information handling system and peripheral device. Pairing information is exchanged between a portable information handling system and base support in response to detection of a connection by the portable information handling system with the base. A WPAN interface is established from the pairing information on power up of the portable information handling system.

More specifically, a tablet information handling system built in a planar housing has a processor that executes an operating system stored in RAM and communicates with peripheral devices through wireless personal area networks, such as Bluetooth. A base having an integrated keyboard supports the tablet information handling system in a viewing position and communicates keyboard inputs through a contact-based connection, such as a wired connector pogo pin interface or contactless interface (like the Keyssa SiBeam), and serial bus, such as an I2C bus. Detection of a contact between base and tablet information handling system pogo pins initiates an auto pairing process supported by communication between an embedded controller of the base and an embedded controller of the tablet. The auto pairing process exchanges pairing information and MAC addresses to support a Bluetooth or other WPAN interface, with the exchange supported independent of the power state of the base and tablet information handling system. The pairing information is stored in flash memory and applied at power up to support automated WPAN pairing without end user inputs.

The present invention provides a number of important technical advantages. One example of an important technical advantage is that a keyboard stand automatically pairs a wireless interface with an information handling system when the information handling system is docked at the keyboard stand. Pairing logic, such as to support a secure Bluetooth interface, is performed on detection of the portable information handling system in the keyboard stand with the pairing operation securely performed using a contact-based interfaced, such as a wired interface and an I2C link. Automated pairing is supported through embedded controller interactions that define a secure link even if the information handling system operating system is not operational. For example, BIOS firmware instructions executing on the information handling system initiate a secure pairing operation upon detection of a keyboard interface so that the keyboard becomes available at information handling system power up and boot. Automated pairing initiates at each physical connection of the information handling system with the keyboard to enhance security, reliability and simplicity of use. When docked, opposing embedded controllers exchange each other's service tag or serial number so that automated pairing is only initiated if the devices have not been paired to each other before. If an existing paired relationship is active or cached, the contact-based paring process is skipped to save Bluetooth connection time. If a keyboard embedded controller detects assignment to a different tablet, the keyboard embedded controller erases the pairing information from the previous system and pairs to the most recent connected system. The keyboard embedded controller remembers one device at any given time so there is no contention with multiply devices. Because of the auto pairing, no Bluetooth pairing button is required so that the keyboard design is more atheistically clean looking.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Automated wireless pairing between an information handling system and base is performed by a contact-based physical interface. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
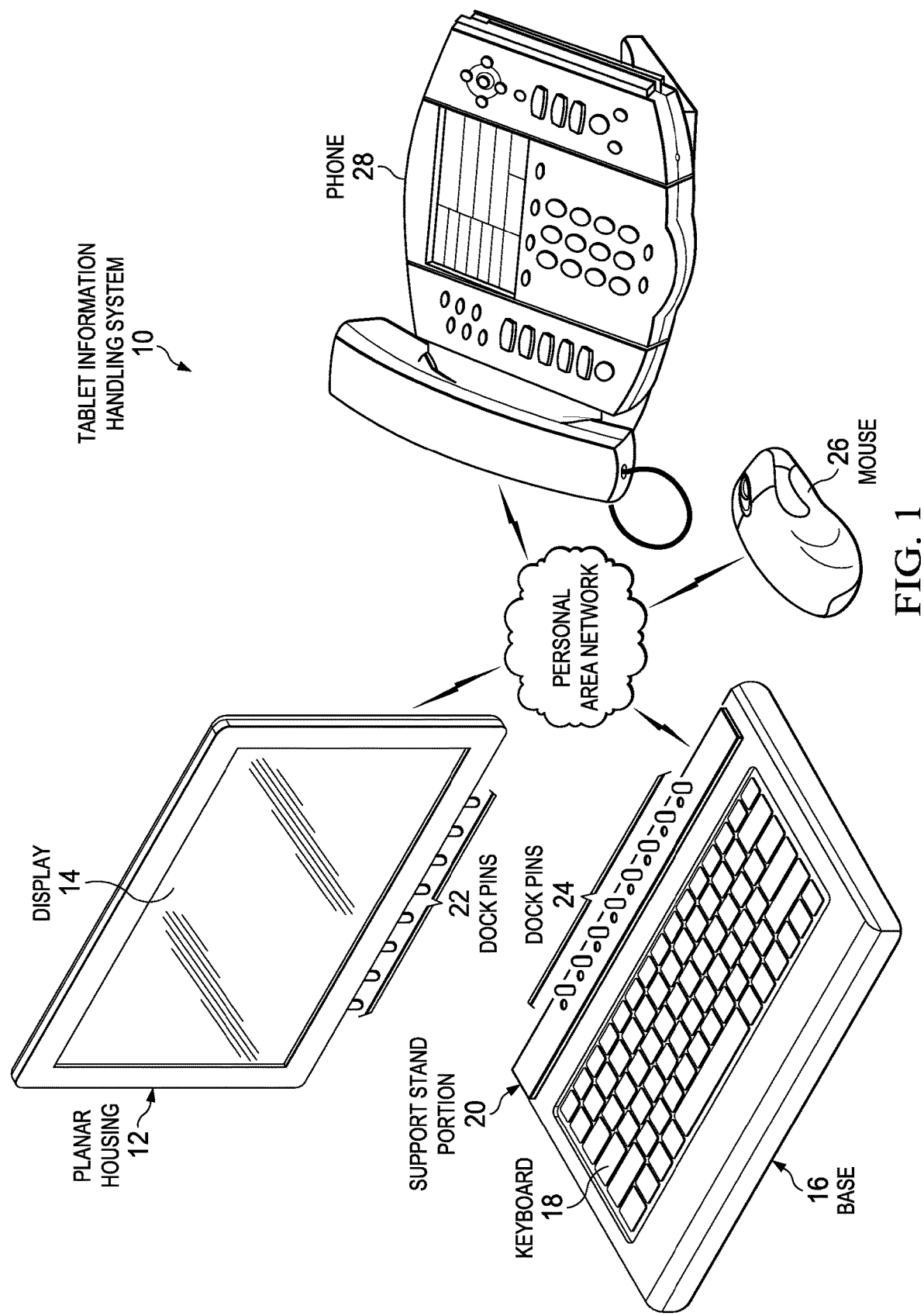
FIG. 1 depicts a tablet information handling system and base with integrated keyboard.

Referring now to FIG. 1, a tablet information handling system 10 is depicted aligned to rest in a base 16 having an integrated keyboard 18. Tablet information handling system 10 has processing components disposed in a planar housing 12 that generates information for presentation as visual images at a display 14. Display 14 includes a touchscreen that accepts touches as inputs to support user interactions, such as by presenting a keyboard image and accepting keyed values correlated between the keyboard depiction and user touches. Base 16 with integrated keyboard 18 has a support stand portion 20 that holds tablet information handling system 10 in a viewing position having display 14 held substantially perpendicular to keyboard 18. When tablet information handling system 10 is held by support stand portion 20, the combined system mimics a clamshell configuration by rotationally coupling tablet information handling system 10 relative to base 16. In some embodiments, a locking system secures base 16 and tablet information handling system 10 so that the combined system operates as a clamshell configuration that offers an end user the flexibility of releasing the tablet for separate use.

To provide communication between tablet information handling system 10 and base 16, opposing docking pins 22 and dock pins 24 contact each other and communicate information through a wired link, such as an I2C serial link that provides a relatively slow and low power communication link adapted for sending keyed inputs from keyboard 18 to tablet information handling system 10. In alternative embodiments, physical contact between tablet 10 and base 16 can initiate a contactless interface, such as a Keyssa contactless connector. In addition, tablet information handling system 10 includes wireless capability that supports interactions with peripheral devices, such as mouse 26 or phone 28 that has a wireless speaker and microphone to support VoIP communications. For instance, a wireless personal area network (WPAN) interface card disposed in base 16 supports a Bluetooth WPAN with tablet information handling system 10 so that the end user may make key inputs through keyboard 18 with tablet information handling system 10 physically separated from base 16.

In the example embodiment depicted by FIG. 1, coupling docking pins 22 and dock pins 24 initiates a Bluetooth pairing operation that is automated and invisible to the end user. Upon detection of the physical interface by pins 22 and 24, an embedded controller within tablet information handling system 10 initiates communication through an I2C link with an embedded controller of base 16 to exchange MAC addresses and pairing information. The embedded controller communication establishes pairing of a WPAN interface card on tablet information handling system 10 and a WPAN interface card on base 16 without having a Bluetooth communication. For example, pairing information and MAC addresses are stored in flash memory by each embedded controller so that the information is accessible by each WPAN interface card on a next power up of the information handling system. In this manner, Bluetooth or other WPAN pairing may be set up with the central processor unit of tablet information handling system 10 powered down and the operating system unloaded. On power up and boot of the operating system, the embedded controller feeds the pairing information to the operating system and WPAN interface card to setup pairing and initiate communication with base 16. Although the example embodiment uses contact pins to initiate the pairing process, the pairing process can be done via a physical or wireless link. Initiation of auto pairing is based upon detection of contact between the keyboard and tablet devices with a physical contact communication. For example, once the keyboard is physically docked to the tablet device, an API on the tablet system puts the operating system into discovery mode and another API on the keyboard side puts the keyboard is advertisement mode so that pairing is initiated as if the user had manually swiped the touchscreen, touched the setup icon, then the pressed a discovery button on the keyboard device. Once the API on both sides initiates the pairing process, actual paring can be done via the traditional Bluetooth link or via the physical interface between the tablet system and the keyboard.

Figure 2:
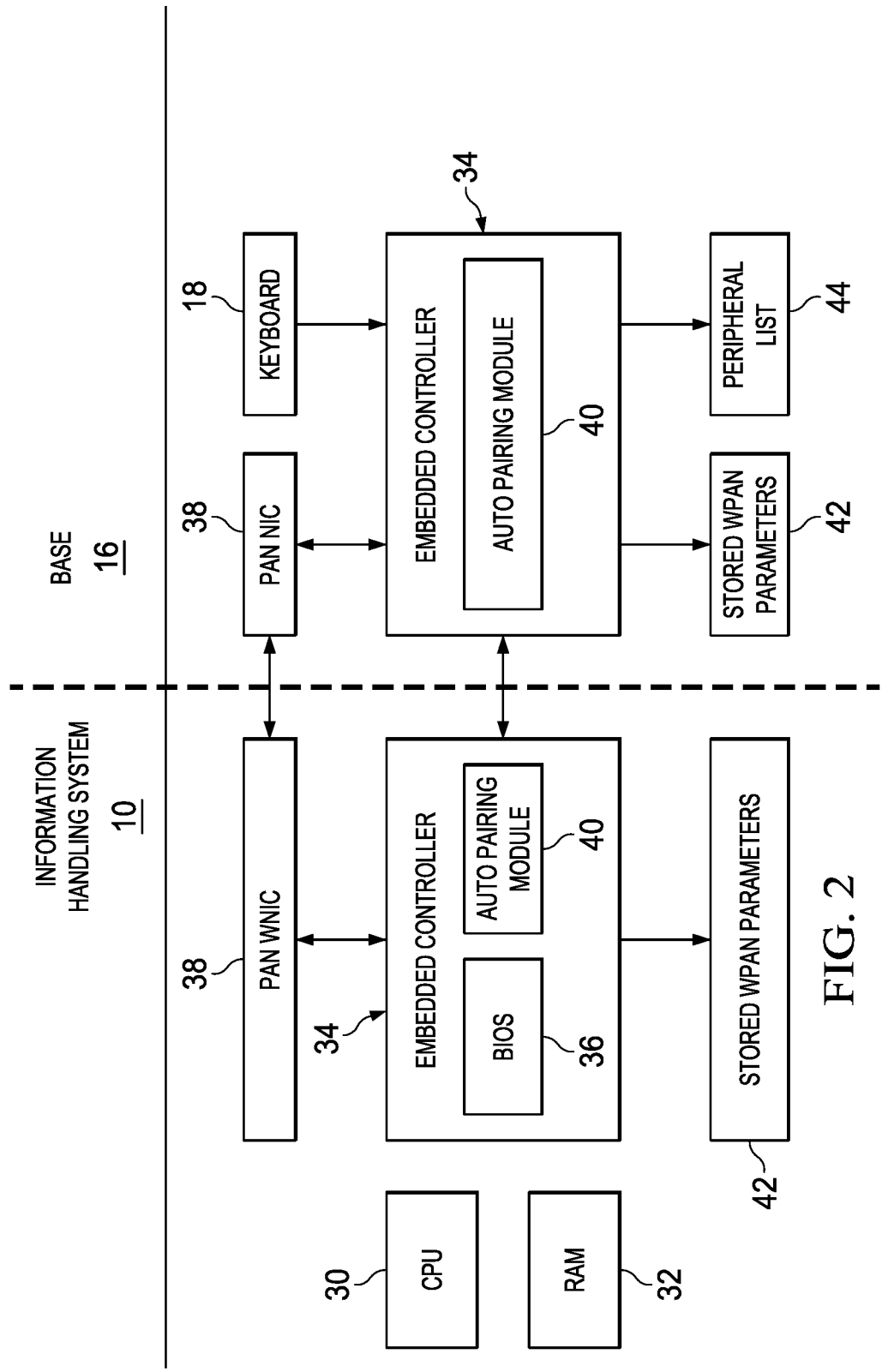
FIG. 2 depicts a block diagram of a system for automated wireless pairing of the tablet information handling system and base.

Referring now to FIG. 2, a block diagram depicts a system for automated wireless pairing of the tablet information handling system 10 and base 16. Tablet information handling system 10 has a central processing unit (CPU) 30 that executes instructions stored in a random access memory (RAM) 32 or other memory. An embedded controller 34 has flash memory that stores firmware code, such as a basic input/output system (BIOS) 36 that coordinates the interaction between hardware components and an operating system. For example, BIOS 36 running on embedded controller 34 manages interactions between a personal area network (PAN) wireless network interface card (WNIC) 38 and an operating system executing on CPU 30, such as to accept keyboard or mouse inputs from Bluetooth communications with peripherals. Base 16 also includes an embedded controller 34 that manages interactions between physical components, such as inputs at keyboard 18. In various embodiments, embedded controller 34 on base 16 is generally a microcontroller capable of acting as a keyboard controller while embedded controller 34 on tablet information handling system has greater capabilities commensurate with managing the more complex physical components within tablet information handling system 10. In one embodiment, base 16 includes a power source that communicates power to tablet information handling system 10; in an alternative embodiment, embedded controller 34 in base 16 is powered from a battery or from power communicated through docking pins 22 and 24.

Each embedded controller 34 includes an auto pairing module 40 that automatically establishes WPAN pairing through an I2C interface provided by docking pins 22 and 24. For example, upon detection of a docking pin connection, a GPIO of the embedded controller 34 initiates auto pairing module 40, which sends a request through an I2C link (or similar contactless link) for communication with an auto pairing module 40 on the opposing embedded controller. Once opposing auto pairing modules 40 are communicating, an exchange of pairing information and MAC addresses is performed with each auto pairing module 40 storing the WPAN parameters of the opposing PAN WNIC 38 in a stored WPAN parameters file 42 on non-transitory memory. In one embodiment, the exchange of pairing information and MAC addresses is supported by local powering of embedded controller 34 while CPU 30 is powered down. Base 16 embedded controller 34 may be powered from tablet information handling system 10 to support auto pairing operations even if local power of base 16 is off. Stored WPAN parameters 42 are made available on power up of information handling system 10 so that PAN WNIC 38 may configure Bluetooth or other WPAN parameters without performing wireless communication. As an alternative, embedded controller 34 may temporarily power up PAN WNIC 38 to configure WPAN parameters while the rest of the system remains powered down. In one embodiment, auto pairing modules 40 coordinate a power up of opposing PAN WNIC's 38 so that a brief wireless exchange of data confirms configuration, and then PAN WNIC's 38 are returned to a power down state.

During operation of information handling system 10 and base 16, information handling system 10 stores in a peripheral list 44 additional WPAN peripherals used simultaneously with base 16. For example, if an end user has a mouse or headset in use at tablet information handling system 10 while base 16 is connected, auto pairing modules 40 share the pairing information and MAC addresses of the peripherals so that base 16 stores the pairing information and MAC address in peripheral list 44. At each connection of tablet information handling system 10 to base 16, auto pairing modules 40 exchange the information on the peripheral list so that tablet information handling system 10 may interact with wireless peripherals associated with base 16. In one embodiment, the stored WPAN parameters 42 are updated at each connection of tablet information handling system 10 with older stored data deleted. Similarly, if information handling system 10 attempts to interact with peripherals on peripheral list 44 without success, auto pairing modules 40 remove the peripherals from peripheral list 44.

Figure 3:
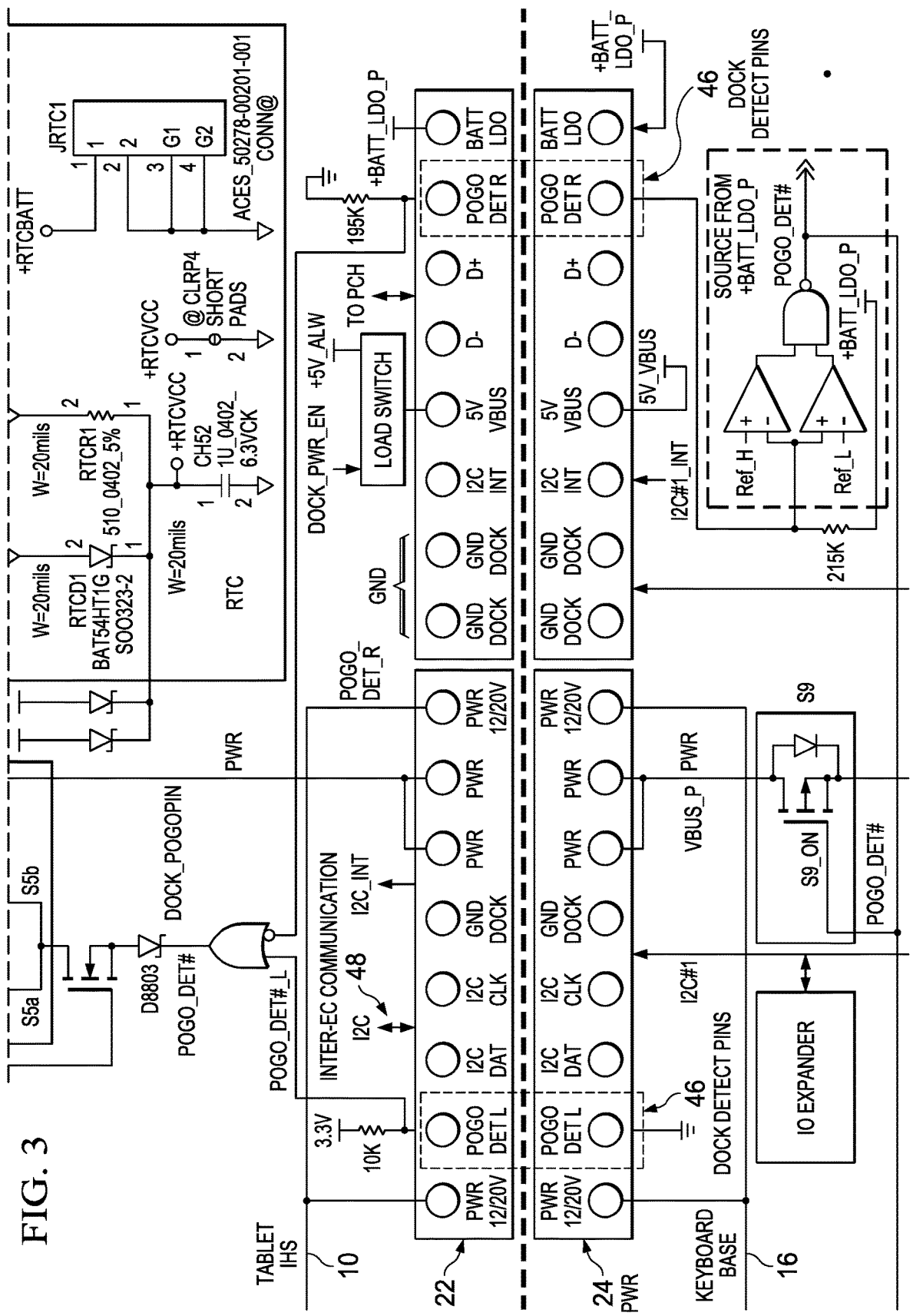
FIG. 3 depicts a circuit block diagram of contact pin interfaces between the tablet information handling system and base.

Referring now to FIG. 3, a circuit block diagram depicts contact pin interfaces 22 and 24 between the tablet information handling system 10 and base 16. For example, pins 22 and 24 are pogo pins aligned to connect when tablet information handling system 10 rests in base 16. Detect pins 46 generate a signal indicating that contact has been made so that embedded controller communication lines 48 may exchange pairing information. Power pins included in pins 22 and 24 provide power to run the embedded controllers and to communicate and store the pairing information.

Figure 4:
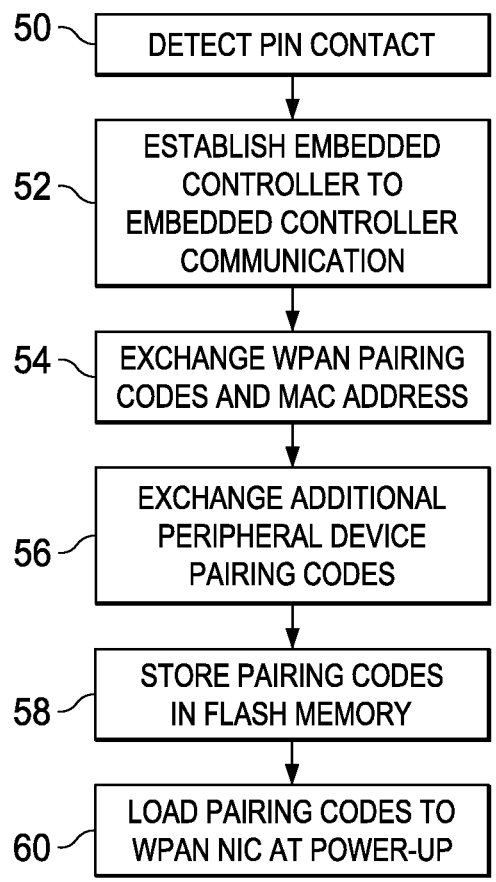
FIG. 4 depicts a flow diagram of a process for automated wireless pairing of a tablet information handling system and base.

Referring now to FIG. 4, a flow diagram depicts a process for automated wireless pairing of a tablet information handling system and base. At step 50, pin contact is detected between tablet information handling system 10 and base 16. At step 52, embedded controller to embedded controller communication is established through the pin contact. In response to the pin contact detection, at step 54, each embedded controller executes firmware that exchanges Bluetooth or other WPAN pairing information sufficient to establish a wireless WPAN connection. The exchange of pairing information may initiate a WPAN interface, or may result in storage of the pairing information for access and use at the next power up of the information handling system. For example, the pairing information is stored in flash memory of a tablet information handling system that the WNIC checks on power up to establish a wireless interface with already known peripheral devices, even though the pairing information may not have been previously used for an interface. At step 56, the embedded controller of the information handling system retrieves from the base embedded controller the pairing information of additional peripheral devices. At step 58, the pairing information is stored in flash memory for use at the next system start. In one embodiment, storing pairing information at an information handling system 10 for a base 16 deletes any stored pairing information for similar base hardware configurations so that pairing information is updated at each connection event. In an alternative embodiment, older pairing information may be stored based upon location. For example, pairing information associated with a work location may be deleted if a different base is detected at the work location. In contrast, pairing information for a home location may be retained for lengthier time periods. At step 60, the pairing information is loaded to the support WPAN interfaces at power up of the information handling system.

Although the present invention has been described in detail, it should be understood that various changes, substitutions and alterations can be made hereto without departing from the spirit and scope of the invention as defined by the appended claims.

What is claimed is:

1. A portable information handling system comprising:
   a planar housing;
   a processor disposed in the planar housing and operable to execute instructions to process information;
   a memory disposed in the planar housing and interfaced with the processor, the memory operable to store the information;
   a display disposed in the planar housing and interfaced with the processor and memory, the display operable to present the information as visual images;
   a wireless network interface card disposed in the planar housing and operable to establish a personal area network with one or more peripheral devices;
   an embedded controller interfaced with the wireless network interface card, the embedded controller having firmware instructions stored in flash memory and operable to manage application of power to the processor;
   plural interface pins exposed at the planar housing and in communication with the embedded controller; and
   an auto pairing module stored as firmware instructions in the flash memory and configured to execute on the embedded controller independent of a power state of the processor to detect contact by the interface pins with exposed interface pins of an external peripheral, and in response to detecting to automatically exchange pairing information with the external peripheral through the contact of the exposed interface pins through a serial link and to store the pairing information in the flash memory;
   wherein the embedded controller is separate from the wireless network interface card and communicates the pairing information to the wireless network interface card without performing wireless communication;
   wherein the external peripheral comprises a base having a predetermined configuration that supports the planar housing in a viewing position, the base integrating a keyboard and the exposed interface pins aligned with the plural interface pins, the auto pairing module deleting pairing information stored at the information handling system for any other bases having the predetermined configuration in response to storing the pairing information of the base in the flash memory.

2. The portable information handling system of claim 1 wherein the external peripheral comprises a keyboard having a peripheral embedded controller, the auto pairing module coordinating pairing information exchange by communication between the information handling system embedded controller and the keyboard peripheral embedded controller.

3. The portable information handling system of claim 2 wherein the information handling system embedded controller detects contact by the interface pins with the processor powered down and, in response to detecting contact by the interface pins powers the keyboard peripheral embedded controller.

4. The portable information handling system of claim 3 wherein the information handling system is further operable to apply power to the wireless network interface card in response to the detecting, to configure the wireless network interface card with the pairing information, and to power down the wireless network interface card after configuring the pairing information.

5. The portable information handling system of claim 1 wherein the external peripheral has non-transient memory storing pairing information of one or more additional peripheral devices, the auto pairing module further operable to exchange the pairing information for the one or more additional peripheral devices.

6. The portable information handling system of claim 5 wherein the one or more additional peripheral devices comprises a mouse.

7. The portable information handling system of claim 5 wherein the one or more additional peripheral devices comprises a communication head set.

8. The portable information handling system of claim 5 wherein the information handling system embedded controller is further operable to detect a pairing operation performed by the wireless network interface card and in response to the pairing operation to store pairing information of the pairing operation in the external peripheral non-transitory memory.

9. A method for pairing a portable information handling system and a peripheral device having a predetermined hardware configuration to wirelessly interact, the method comprising:
   resting the portable information handling system on the peripheral device to interface contact pins exposed at a housing of the portable information handling system with contact pins exposed at a housing of the peripheral device;

detecting at an embedded controller of the portable information handling system the interface of the contact pins, the detecting independent of a power state of a processor of the portable information handling system;

in response to the detecting, communicating through the contact pins wireless personal area network pairing information of the portable information handling system to the peripheral device and of the peripheral device to the portable information handling system embedded controller;

in response to the communicating, storing the peripheral device wireless personal area network pairing information in non-transient memory of the information handling system;

communicating through the contact pins from the peripheral device wireless personal area network pairing information of one or more additional peripheral devices to the portable information handling system embedded controller;

applying the pairing information to pair the portable information handling system with the peripheral device by communicating the pairing information from the embedded controller to a separate wireless network interface card;

applying the wireless personal area network pairing information of the one or more additional peripheral devices to pair the information handling system to the one or more additional peripheral devices by communicating the pairing information from the embedded controller to the separate wireless network interface card; and in response to the storing the wireless personal area network pairing information, deleting from the information handling system all pairing information stored for other peripheral devices having the predetermined hardware configuration.

10. The method of claim 9 wherein the wireless personal area network comprised Bluetooth.

11. The method of claim 9 further comprising:
powering down a central processing unit of the information handling system before the resting; and
in response to detecting, powering the embedded controller for the communicating without power up the central processing unit.

12. The method of claim 11 further comprising:
powering down a wireless personal area network interface card before the resting; and
in response to detecting, powering the wireless personal area network interface card to interact with the embedded controller and configure the pairing information without power up of the central processing unit.

13. The method of claim 9 wherein the peripheral device comprises a keyboard and the one or more additional peripheral devices comprises a mouse.

14. A base having a support stand portion configured to hold a tablet information handling system in a viewing position; a keyboard integrated in the base and aligned substantially perpendicular to the tablet information handling system viewing position; plural contact pins exposed in the support stand portion and aligned to interface with contact pins exposed at the tablet information handling system; an embedded controller disposed in the base and interfaced with the keyboard and the contact pins, the embedded controller operable to detect keyed inputs and communicate the keyed inputs to the tablet information handling system through the contact pins; a wireless personal area network interface card interfaced with the embedded controller and operable to communicate the keyed inputs to the tablet information handling system through a wireless personal area network; and an auto pairing module stored in non-transitory memory of the embedded controller, the auto pairing module operable to execute on the embedded controller at detection of an interface at the contact pins to exchange pairing information with the tablet information handling system for establishing a wireless personal area network interface without communicating through the wireless personal area network interface card, the auto pairing module deleting all other pairing information stored locally for information handling systems other than the tablet information handling system detected at the interface of the contact pins; wherein the auto pairing module is further operable to store pairing information of one or more peripheral devices associated with the keyboard and to communicate the pairing information of the one or more peripheral devices to the tablet information handling system in response to the detection of the interface, the tablet information handling system storing the pairing information in non-transient memory and applying the pairing information to wirelessly pair directly to the one or more peripheral devices, the tablet information handling system deleting pairing information of any other bases from the non-transient memory in response to storing the pairing information of the base in the flash memory.

15. The tablet information handling system keyboard stand of claim 14 wherein the wireless personal area network comprise Bluetooth.

16. The tablet information handling system keyboard claim 14 wherein the one or more peripheral devices comprises a mouse.

17. The tablet information handling system keyboard stand of claim 16 wherein the mouse pairing information is determined by the tablet information handling system with a wireless pairing operation and communicated by the tablet information handling system to the embedded controller through the contact pin interface for storage in the non-transitory memory.

18. The tablet information handling system keyboard stand of claim 15 wherein the detection of the interface at the contact pins comprises powering of the embedded controller with power from the tablet information handling system.

* * * * *